Dec. 10, 1929.　　　　D. EISINGA　　　　1,738,878
THERMOSTATIC CONTROL
Filed April 22, 1926　　　3 Sheets-Sheet 1

INVENTOR
Dirk Eisinga
BY
　　　　　　　　
ATTORNEY

Dec. 10, 1929.  D. EISINGA  1,738,878
THERMOSTATIC CONTROL
Filed April 22, 1926    3 Sheets-Sheet 2

INVENTOR
Dirk Eisinga
BY
ATTORNEY

Dec. 10, 1929.  D. EISINGA  1,738,878
THERMOSTATIC CONTROL
Filed April 22, 1926   3 Sheets-Sheet 3

INVENTOR
Dirk Eisinga
BY
*Gilbright Arnold*
ATTORNEY

Patented Dec. 10, 1929

1,738,878

UNITED STATES PATENT OFFICE

DIRK EISINGA, OF LOS ANGELES, CALIFORNIA, ASSIGNOR TO NATIONAL STEEL CON-STRUCTION CO., OF SEATTLE, WASHINGTON, A CORPORATION OF WASHINGTON

THERMOSTATIC CONTROL

Application filed April 22, 1926. Serial No. 103,713.

My invention relates to thermostatic controls. More particularly, my invention relates to thermostatic controls where the effect of the gradual change or movement of the thermo element is accumulated and suddenly released.

This invention will be described as applied to controlling electric switches used in conjunction with an alternating electric current circuit for heating water in a hot water tank for domestic purposes, in order that it may be more accurately understood, but it is to be noted that it is not limited to any such specific field of application, but is co-extensive in all fields involving similar conditions, in part or in toto.

Thermostatic control switches as heretofore designed ordinarily are for low wattage, fifteen to one hundred watts, for example, and are ordinarily connected with a remote control to open and close the main circuit. The requirements for heating water for ordinary domestic purposes involve the use of a power of about 3500 watts.

A fundamental condition for a thermostatic control switch is that there must be no heating of the contact points because all such heating interferes with the accurate operation of the thermostatic element as respects the particular environment which it is designed to regulate. The arcing that ordinarily results tends to develop considerable heating and also to destroy the contact points. These features render the ordinary thermostatic control entirely impractical for relatively high wattage, where considerable power is required to separate the electric contact points and the points must be moved into a relatively wide separation. To the end of meeting these conditions, a primary purpose of my invention, herein set forth, is to permit the accumulation of the change of motion of the thermo metal and then to cause the switch members to be moved with the necessary power and with a snap action, which avoids the creation of an arc, and to place such contact members in such a relatively large spaced relation with respect to each other when moved apart that arcing will be avoided.

One condition for a thermostatic switch is that it should be free from remote control devices and thereby avoid parts to get out of order. There are also two other serious objections to thermostatic switches involving the use of a remote control to handle the large power. Such switches are more expensive, and they also produce a humming noise that makes them particularly objectionable for domestic purposes. In short, a primary object of my invention is to provide a thermostatic control that will operate quietly and directly, i. e., independently of any remote control mechanism for an alternating current.

In supplying a control for such a switch, a further condition is that it should be relatively sensitive, that is, a change of a few degrees of temperature should result in the operation of the switch, or at least such operation should be subject to ready adjustment for predetermined temperatures if desired. Obviously, a change of a few degrees of temperature results in but a small displacement of the thermo metal, so that the device must be capable of operation with very small change in the thermo element. On the other hand, in the use of relatively high wattage it requires a considerable force to separate the contact points. Manifestly, these two conditions are directly opposed to each other. A primary object of my invention is to provide special means which permits the small motion of the thermo element to be gradually accumulated in resilient means, which power having been stored to a predetermined degree is at a desired point permitted to actuate the switch members with a snap action, thereby avoiding all heating and arcing, and at the same time provide the necessary sensitiveness of operation.

The fact that there is such a small movement on the part of the thermo element makes it fundamentally important that the actuating thermo element and the fulcrum support and the lever means disposed therebetween should all be so related to each other that their relative positions are at all times maintained as designed. A fundamental requirement of a thermo switch is accuracy and precision of operation, and this relative position of the parts is fundamental to providing such accuracy.

A further condition to be satisfied in a control for a switch, particularly for domestic purposes, is that it must be of such a character as to be economical and to entail the minimum of service after being once installed, and the control must be of such a character, i. e., must be accessible, as to render any such necessary service as positively inexpensive as possible.

A further condition is that the control must be adjustable to provide water of a desired temperature.

A primary object of my invention is to provide a thermostatic control satisfying all the above conditions.

The above mentioned general objects of my invention, together with others inherent in the same, are attained by the device illustrated in the following drawings, the same being merely preferred exemplary forms of embodiment of my invention, throughout which drawings like reference numerals indicate like parts:

Figure 1:
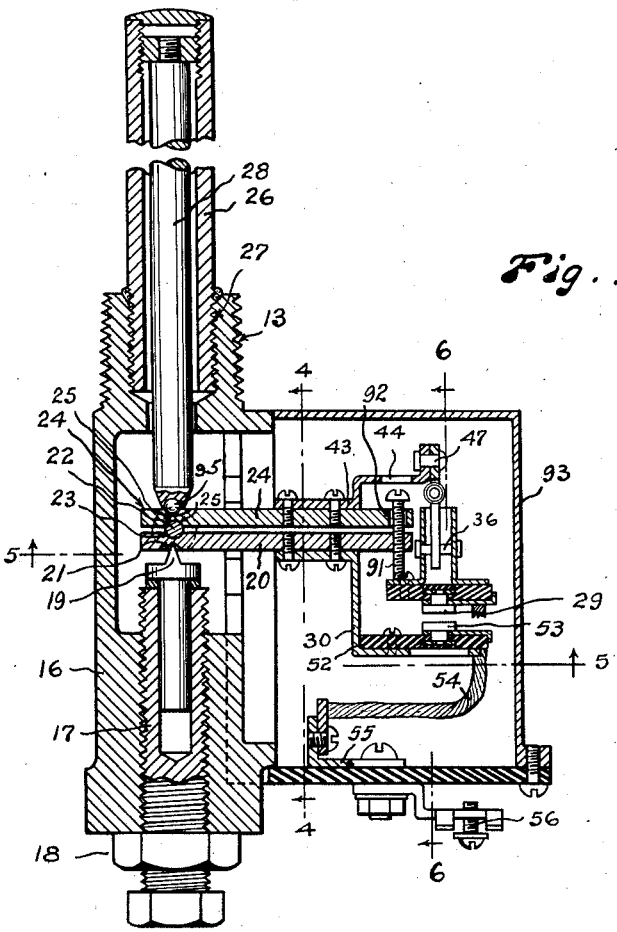
Figure 1 is a view in transverse section of a thermostatic control embodying my invention.
Figure 5:
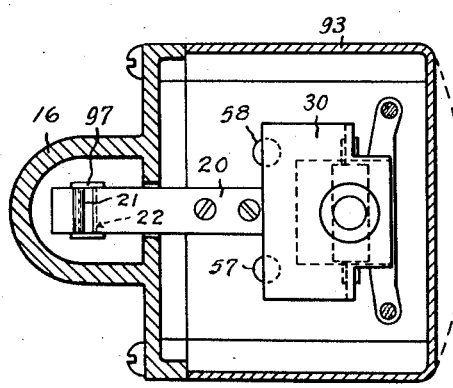
Fig. 5 is a view on broken line 5, 5 of Fig. 1.
Figure 4:
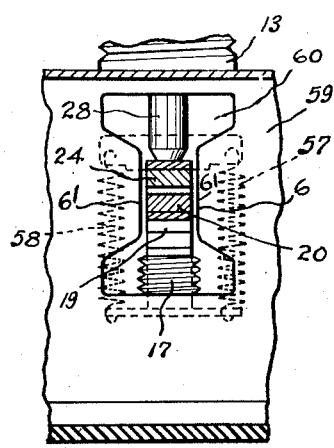
Fig. 4 is a view in cross-section on dotted line 4, 4 of Fig. 1.
Figure 2:
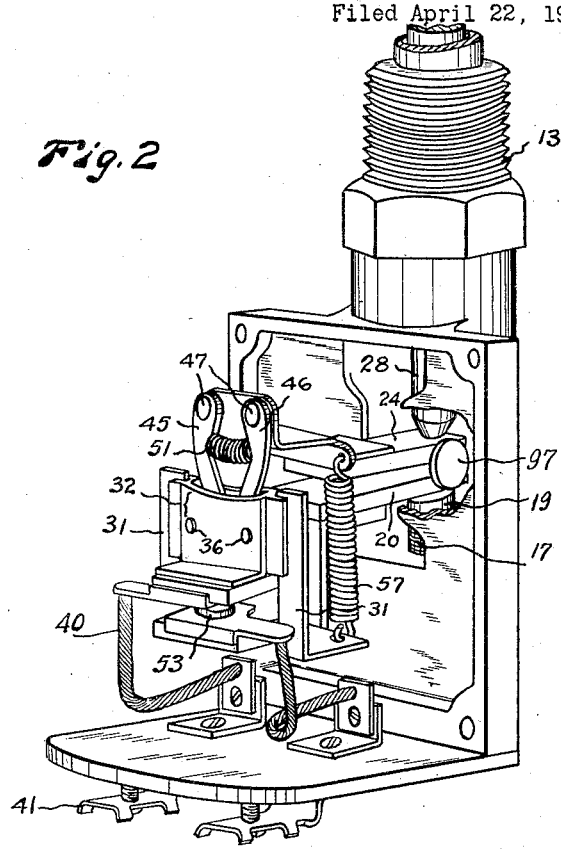
Fig. 2 is a fragmentary enlarged view in perspective of the same.

In the bottom 11 of a hot water tank, a thermostatic control 12 embodying my invention is secured by means of the threaded portion 13, having the end portion 14 constituting the thermostatic means inserted either in the cold water inlet pipe 15, as illustrated, or said end portion may be located in the lower part of the tank outside of the cold water inlet pipe.

In the base member 16, an adjustable bolt 17 is disposed, having lock nut 18. In this adjusting bolt 17, a knife edge member 19 is positioned. A lower lever 20 having a groove 21 is mounted on said knife edge, which is adapted to fit said groove. A fulcrum pin 22 is disposed in a transverse groove 23 in said lower lever, and an upper lever 24, having a transverse groove 25 therein, is mounted on said fulcrum pin. Retaining rings 97 constituting a part of the fulcrum pin 22 are of such a diameter as to overlap the ends of the knife edges, thereby keeping the respective parts in position.

Thermo element 26, being a metal characterized by having a relatively high coefficient of expansion, is securely held in base 12 by threads 27, and excludes water from entering the switch parts. This thermo element is a support for rod 28, which is of a metal characterized by its relatively low coefficient of expansion, and is provided with a hard steel ball 95 to provide a bearing in connection with the upper lever 24. The axis of the fulcrum pin 22 does not coincide with the line joining the center of the ball 95 and the knife edge 21, but is slightly to one side thereof. The small discrepancy thus provided constitutes one lever arm. Lower lever 20 is provided with extension 30, which is provided with two lateral guide members 31, in which a switch member 32 is slidably mounted. Switch member 32 has back and front plates 33 and 34, with grooves 35 to receive guide members 31. Pins 36 extend through plates 33 and 34. A bakelite plate 37 is secured to the flange 38 of the plates 33 and 34. In this bakelite member, a contact point 29 is mounted, having a flexible connector 40, which is electrically connected to electric contact post 41, mounted on the bakelite support 42 secured to the base member 16.

The upper lever 24 has extension 43 with opening 44. On said extension are pivotally mounted cam arms 45 and 46 by pins 47. These cam arms have cam faces 48 and 49, which meet in points 50. Spring 51 functions to press the cam arms apart. The said cam arms are disposed to pass over the pins 36 of the switch member 32.

Bakelite plate 52 is mounted on extension arm 30, and in it is mounted contact point 53 which is electrically connected by means of flexible connector 54 and connector 55 to an electrical contact post 56. Springs 57 and 58 are connected to the upper extension 43 and lower extension 30 and tend to draw the two levers together. The base member 16 is formed with a plate 59, in which is an opening 60 having parallel sides 61. These serve as guides for the levers 20 and 24.

Figure 8:
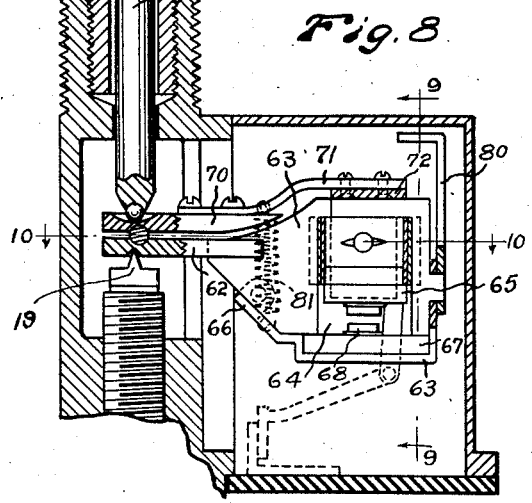
Fig. 8 is a fragmentary view in section of a modified form of thermostatic control embodying my invention.
Figure 9:
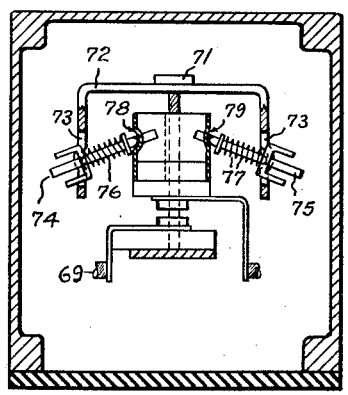
Fig. 9 is a view in cross section on dotted line 9, 9 of Fig. 8.
Figure 10:
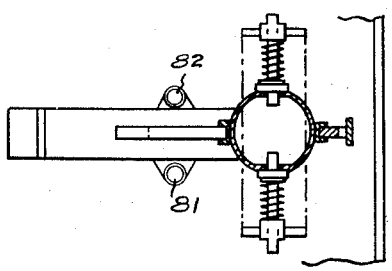
Fig. 10 is a view in cross section on dotted line 10, 10 of Fig. 8.

In the modified form of the upper and lower levers and associated switch member embodying my invention, shown in Figs. 8, 9, 10, the lower lever arm 62 has an extension plate 63, which has a rectangular opening 64 disposed therein, the sides of which constitute a guide for the movable cylindrical switch member 65. Also extension plate 64 carries the arm 66 on which is mounted bakelite plate 67, which carries contact point 68, which is connected by flexible cable 69 to suitable electrical contact posts (not shown).

Upper lever 70 has extension arm 71, which carries a transverse arm 72. In openings 73, oppositely disposed in said arm 72, there are mounted two pivoting pins 74 and 75, which carry springs 76 and 77, said pivotal pins being pivotally mounted as respects the transverse arm 72 and also having pivotal bearing 78 and 79 as respects the switch member 65. Extension arm 66 has mounted thereon stop 80. Springs 81 and 82 tend to hold the lever arms together.

Figure 11:
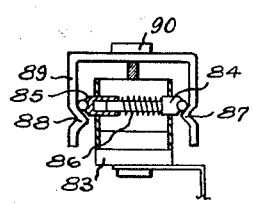
Fig. 11 is a view of a modified form of a detail of my invention.

In the still further modified form of a detail of my invention, shown in Fig. 11, the movable switch member 83 has slidably mounted therein a rod 84, one end of which is slidably mounted in a hollow rod 85, which parts are forced apart by means of spring 86, so that the end portions of rods 84 and 85 are caused to bear against cams 87 and 88 formed in transverse arm 89 carried by the upper extension arm 90 corresponding to upper extension arm 71 in Fig. 9.

Figure 12:
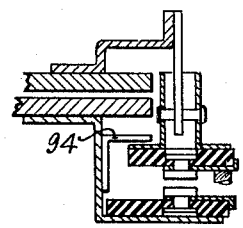
Fig. 12 is a view of a modified form of stop.

A modified form of stop member 94 is shown in Fig. 12.

The mode of operation of a device embodying my invention is as follows: The device as herein illustrated and described relates to the use of an alternating current having a magnitude of 3500 watts. If a direct current is to be used, then the same device is manifestly applicable; however, there would be employed the well known remote control device in the form of a magnetic switch, in order to open and close the power circuit. With the alternating current, however, no such remote control device is necessary with the thermostatic control embodying my invention, alternating current being the usual current employed for domestic purposes, which thus provides for protection against over-heating of the water as well as economy of operation.

Figure 6:
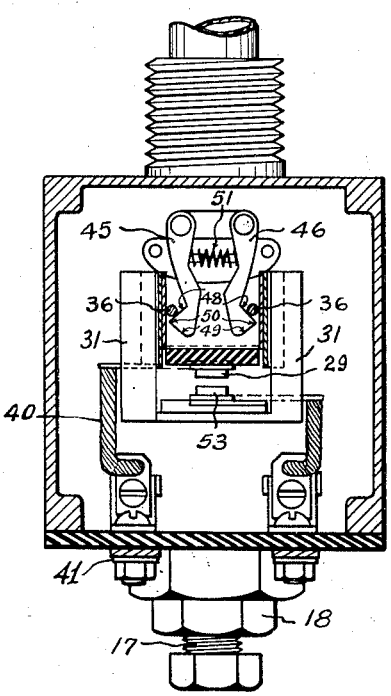
Fig. 6 is a view in section on line 6, 6 of Fig. 1.
Figure 7:
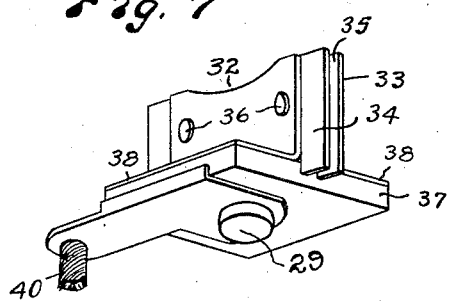
Fig. 7 is a view in perspective of the slidable switch member.

Cold water entering the tank through inlet pipe 15 comes in contact with the thermo element 26, causing the same to contract, and thereby pushing downwardly the rod 28, which, having a low coefficient of expansion, is moved up or down to the same degree as the thermo element 26, by reason of its being mounted upon and carried by said thermo element 26. Since the downward movement of the rod 28 corresponds with the gradual contraction of the thermo element 26, a force is applied to the lever 24, causing the extension end portion 43 to move upwardly about the axis of fulcrum pin 22 as a center, and at the same time forcing downwardly the lower lever 20 with its extension 30, thereby providing for maximum displacement. This results in raising the cam arms 45 and 46 against the resiliency of spring 51, i. e., the power developed by the relatively slow movement arising by reason of the contraction of thermo element 26, in conjunction with the lever 24, is gradually stored in spring 51 and springs 57 and 58, and in the meantime a downward movement is imparted to the switch member 32 by contact with the stop 91, the contact points 29 and 53 being assumed to be originally in spaced relation as shown in Fig. 6. There is no relative movement between the switch member 32 and the extension arm 30 until the snap action occurs as hereinafter set forth. When the cam points 50 of the cam arms 45 and 46 are gradually raised by the contracting of the thermo element 26, as explained, until they pass the center of pins 36, then the force of spring 51, forcing outwardly the cam arms 45 and 46, is freed and spends its force by pushing outwardly the said cam arms, thereby suddenly bringing the cam faces 49 of each of the cam arms against the pins 36, which manifestly drives downwardly with a snap action the movable switch member 32, thereby suddenly forcing into electrical connection contact points 29 and 53, so that the electric current is caused to heat the water in the tank.

With the heating of the hot water thus re-established, the water in the tank will be gradually heated, and as this comes in contact with the thermo element 26, the said element will be gradually expanded, thereby lifting rod 28, so that the springs 57 and 58 are permitted to draw together the upper lever 24 and the lower lever 20. Since the lifting of the rod 28 is slow and gradual, the power is gradually stored in the spring 51, again putting it under compression as the cam arms 45 and 46 are gradually pulled downwardly against pins 36 by reason of the force of springs 57 and 58. When cam points 50 of the cam arms pass the center of the pins 36, the force of the spring 51 is suddenly released and the pressure forcing apart the arms expends itself and forcibly actuates the cam faces 48 against the pins 36, causing the movable switch member 32 to suddenly move upwardly with a snap action, thus breaking the current and stopping the further heating of the water in the tank until such time as the temperature of the water in contact with the thermo element 26 contracts the same and forces the contact points 29 and 53 into electrical connection again as hereinabove described, and the process is repeated.

It will be noted that the operating of the contact points is that of a snap action, both in closing and opening the circuit. This prevents the drawing of an arc and thereby prevents the destruction of the contact points which are preferably of silver metal. Tests in the Underwriters' laboratory, in which the device herein illustrated embodying my invention was subjected to a ten-thousand operation test, proved that there was not any arcing and no heating of the device, in all that extensive test, with a fifty percent wattage overload. In every respect the device met the exact requirements. The snap action is positively required in order to prevent the drawing of an arc.

One hundred and twenty degrees to one hundred and sixty degrees is the ordinary temperature desired in water for domestic household purposes, and the device herein described may be adjusted to keep the water at said temperature by adjusting the screw 17, which carries the knife edge member 19. By screwing this upwardly, the temperature of the water will be maintained at a higher temperature than when a greater distance obtains between the knife edge 21 and the steel ball bearing 95, because, manifestly, by making the distance shorter between these two points, the extensions 30 and 43 mounted on the levers 20 and 24 respectively are moved further apart, and the thermo element 26 must expand further before the circuit is opened, and therefore the temperature of the water is maintained at a higher point than when the thermo element 26 has a wider spaced, or rather, more loose relationship with the knife edge 21 through the rod 28 and the ball 95. Retaining rings 97 are mounted on the end of fulcrum pin 22 and are of such diameter as to extend over the upper portion of the knife edge 19, whereby they operate as an aligning means and retaining means for the movable levers 20 and 24.

Figure 3:
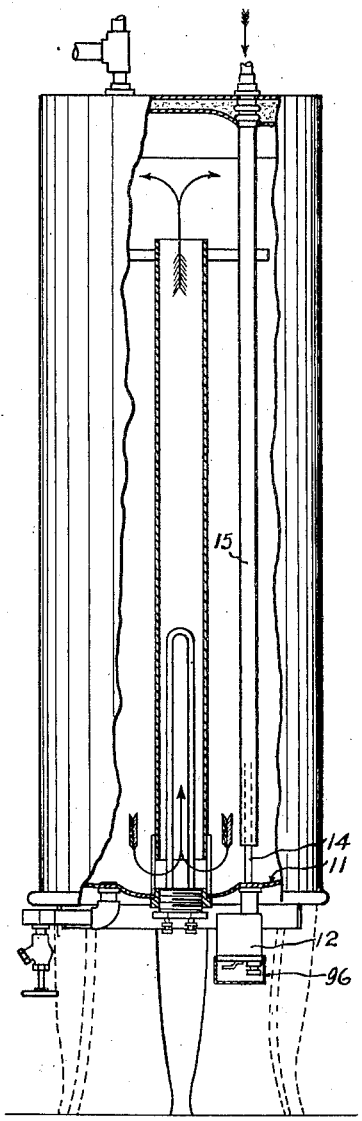
Fig. 3 is a sectional view of a hot water tank with a thermostatic control embodying my invention applied thereto.

The axis of the fulcrum pin 22 is but very slightly outside of the line joining the center of the ball 95 and the knife edge 21; for example, fifteen one-thousandths of an inch has been found to work very satisfactorily when the other lever arm is two to three inches in length. On the one hand, there is the condition requiring this distance to be small by reason of the fact that the movement due to the contraction of the thermo element is relatively small, and if the necessary degree of sensitiveness of operation of the control is to be provided, i. e., if a change of temperature in the water of fifteen or twenty degrees is to result in opening or closing the switch, then this lever must be relatively very small. On the other hand, the opening and closing of a circuit of such relatively high wattage as 3500 involves a considerable magnitude of power to make or break the contact. Moreover, the distance apart at which the electrical contact points 29 and 53 should be maintained must be considered, in order to avoid any arcing with such high wattage. Manifestly, such arcing tends not only to destroy the contact points, but also tends to heat up the device and therefore render it inaccurate as a temperature gauging means for the medium, the temperature of which it is designed to control. Therefore, these last two conditions in conjunction, namely, the magnitude of power necessary to operate the contact points, and the distance at which the points must be moved apart, militate against a short lever on the opposite side. But the difficulty is overcome by means of the device as herein shown. The extreme smallness of the lever between the axis of the fulcrum pin 22 and the line joining the center of the ball 95 and knife edge 21 requires that the said relationship be positively assured at all times, i. e., there must be no lagging or catching of the lever 24 in its movement up and down. All play between the parts must be eliminated for precision of action. To assure this condition, I preferably employ a floating lever means. The lever 20 is pivotally mounted on knife edge 21 and lever 24 is in turn pivotally mounted on fulcrum pin 22. Springs 57 and 58, tending to pull together the levers 20 and 24, maintain the said arms respectively in direct contact with the knife edge 21 and the ball bearing 95. The plate 59, with the parallel sides 61, operates to maintain the lever 24 in superimposed relation to lever 20. Lower lever 20 carries adjusting screw 91, which passes through lever 24 in opening 92, so that lever 24 is freely mounted as respects screw 91 until the lever strikes the head of the screw 91. The screw 91 may be adjusted by inserting the screw driver through the opening 44, the said screw being threadedly mounted in lever 20. This stop operates both as a stop for the upper lever 24 and the switch member 32. Since the entire mechanism below the threaded portion 13 of the base is outside of the water tank, (see Fig. 3), it is manifest that the control embodying my invention is accessible at all times for any service requirements. It is only necessary to remove cover 93 and cover 96 functions as a condulet. Furthermore, not only can the said adjustments be made, but it is manifest that by removing the adjusting nut 17, the levers 20 and 24 and all the parts within the cover 93 are readily removable and replaceable, if at any time the same becomes necessary. From the ten thousand successful operation test above indicated, with the indicated overload, it seems manifest that the elements of the device embodying my invention have been so adjusted that the likelihood of much service requirement is very remote. Thus is a fundamental condition satisfied.

In respect to the modified forms of the device embodying my invention, as shown in Figs. 8, 9 and 10, it is clear that the general operation is the same as that set forth for the preferred form hereinabove described,—the differences being merely of a structural character. The all-important snap action is provided by the pivotally mounted pins 74 and 75 and the associated parts.

In the modified form shown in Fig. 11, it is manifest that the cam arms are in fixed relation in contrast with the movable cam arms 45 and 46 in the preferred form,—the mode of operation being similar in both instances.

Obviously, changes may be made in the form, dimensions and arrangement of the parts of my invention, without departing from the principle thereof, the above setting forth only preferred forms of embodiment.

I claim:

1. A thermostatic control embodying a base member; a fulcrum means mounted on said base; lever means operatively disposed on said fulcrum; thermostatic means operatively connected to said lever means; an electric switch member; actuating means for said electrical switch member; an electrical contact point mounted on said electrical switch member; and a second electrical contact point mounted on the lever means.

2. A thermostatic control embodying a base member; a fulcrum means mounted on said base; lever means operatively disposed on said fulcrum; thermostatic means operatively connected to said lever means; an electrical switch member mounted on the fulcrum means; actuating means for said electrical switch member; an electrical contact point mounted on said electrical switch member; and a second electrical contact point mounted on the lever means.

3. A thermostatic control embodying a base member; a fulcrum means mounted on said base; lever means operatively disposed on said fulcrum; a relatively high coefficient of expansion thermo element mounted on said base member; a relatively low coefficient of expansion means carried by said thermo support operatively connected to said lever means; an electrical switch member movably mounted on the fulcrum means; actuating means mounted on said lever means for said electrical switch member; and electrical contact point mounted on said electrical switch member; and a second electrical contact point mounted on the lever means.

4. A thermostatic control embodying a base member; a fulcrum means mounted on said base; lever means operatively disposed on said fulcrum; thermostatic means operatively connected to said lever means; resilient means operatively mounted on said fulcrum means and lever means; an electrical switch member; actuating means for said electrical switch member; an electrical contact point mounted on said electrical switch member; and a second electrical contact point mounted on the lever means.

5. A thermostatic control embodying a base member; a fulcrum means mounted on said base; lever means operatively disposed on said fulcrum; thermostatic means operatively connected to said lever means; an electrical switch member; actuating means for said electrical switch member; stop means which limits the movement of said switch member; an electrical contact point mounted on said electrical switch member; and a second electrical contact point mounted on the lever means.

6. A thermostatic control embodying a base member; a fulcrum means mounted on said base; floating lever arms operatively disposed on said fulcrum; thermostatic means operatively connected to said lever means; an electrical switch member movably mounted on the fulcrum means; actuating means for said electrical switch member; an electrical contact point mounted on said electrical switch member; and a second electrical contact point mounted on the lever means.

7. In combination with a thermostatic control having a thermostatic means, the combination of a knife edge, a lower movable lever mounted thereon; a fulcrum pin disposed transversely of said lever; and an upper lever mounted on said pin and operatively engaged by said thermostatic means, the axis of said pin being off the line joining the knife edge and the point of bearing of the thermostatic member.

8. In combination with a thermostatic control having a thermostatic means, the combination of a knife edge, a lower movable lever mounted thereon; a fulcrum pin disposed transversely of said lever; an upper lever mounted on said pin and operatively engaged by said thermostatic means, the axis of said pin being off the line joining the knife edge and the point of bearing of the thermostatic member; and retaining rings mounted on the end portions of said fulcrum pin, said retaining rings being of such diameter as to overlap the ends of said knife edge.

9. A thermostatic control embodying a base member; a thermostatic means; a knife edge mounted on said base; a movable lever mounted on said knife edge; a fulcrum pin disposed transversely of said movable lever; an upper lever member mounted on said fulcrum pin, against which said thermostatic means is operatively disposed to bear, the axis of said fulcrum pin being outside of the line joining the knife edge and the center of bearing of the thermostatic means; an electrical switch member movably mounted upon the said lower movable lever, having two cam engaging pins mounted thereon; actuating means for said electrical switch member embodying two cam arms having a resilient means disposed therebetween, said cam arms being operatively disposed to pass over said cam pins of said switch member; a stop means which limits the movement of said switch member and said upper lever member; resilient means operatively mounted on said upper and lower movable levers; an electrical contact point mounted on said electrical switch member; and a second electrical contact point mounted on the lower lever.

10. In combination with a thermostatic control, a floating lever means embodying two lever arms and a fulcrum pin transversally disposed therebetween.

11. In combination with a thermostatic control, a floating lever means embodying two lever arms; a fulcrum pin transversely disposed between said lever arms and an electric switch member slidably mounted on one of said lever arms.

12. In combination with a thermostatic control, a floating lever means embodying two lever arms; an electric contact point mounted on one of said lever arms; an electric switch member slidably mounted on one of said lever arms and an electric contact point registerably mounted on said switch member with respect to said first mentioned contact point.

13. In combination with a thermostatic control, a floating lever means embodying two lever arms; two cam arms mounted upon one of said lever arms; an electric switch member slidably mounted on one of said lever arms and two cam pins mounted in said switch member, engageable by said cam arms and resilient means operatively disposed between said cam arms.

In witness whereof, I hereunto subscribe my name this 27th day of March, 1926.

DIRK EISINGA.